(12) United States Patent
Anderson

(10) Patent No.: US 6,296,259 B1
(45) Date of Patent: *Oct. 2, 2001

(54) CHILD SAFETY SEAT STROLLER

(75) Inventor: Pauline A. Anderson, Louisville, KY (US)

(73) Assignee: Dreams & Visions of Inspirations, Inc., Louisville, KY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,367

(22) Filed: Jan. 27, 1999

Related U.S. Application Data

(60) Provisional application No. 60/072,743, filed on Jan. 27, 1998.

(51) Int. Cl.[7] .................................................. B62B 7/12
(52) U.S. Cl. ........................... 280/30; 280/648; 280/649; 297/6
(58) Field of Search .................... 280/43, 30, 38, 280/642, 647, 648, 649, 650, 641, 658, 643; 297/6

(56) References Cited

U.S. PATENT DOCUMENTS

| | | | |
|---|---|---|---|
| 4,019,756 | * | 4/1977 | Ishida ................................ 280/649 |
| 4,359,242 | * | 11/1982 | Gerken et al. ........................... 297/5 |
| 4,828,281 | * | 5/1989 | Sanchas ................................ 280/30 |
| 4,878,680 | * | 11/1989 | Molnar ................................. 280/30 |
| 4,896,894 | * | 1/1990 | Singletary ............................. 280/30 |
| 4,989,888 | * | 2/1991 | Qureshi et al. ........................ 280/30 |
| 5,324,064 | * | 6/1994 | Sumser et al. ....................... 280/649 |
| 5,468,014 | * | 11/1995 | Gimbel et al. ....................... 280/735 |
| 5,499,831 | | 3/1996 | Worth et al. . |
| 5,567,008 | | 10/1996 | Coue, II . |
| 5,660,430 | | 8/1997 | Clarke . |
| 5,676,386 | | 10/1997 | Huaug . |

\* cited by examiner

*Primary Examiner*—J. J. Swann
*Assistant Examiner*—David R. Dunn
(74) *Attorney, Agent, or Firm*—Carrithers Law Office; David W. Carrithers

(57) ABSTRACT

A integral carry-on child safety seat and stroller. The safety seat includes a base frame having wheels which is supported by collapsible folding members which may be nested in the housing of the safety seat for use in a vehicle whereby the base frame and wheels are expandable upon removal from the vehicle to form a stroller.

19 Claims, 4 Drawing Sheets

CHILD SAFETY SEAT STROLLER

This application claims priority from provisional application Ser. No. 60/072,743 filed on Jan. 27, 1998.

BACKGROUND OF THE INVENTION

Conventional safety seats have a base which sets upon a seat of a vehicle, such as a car seat. Strollers are typically tall enough to push conveniently and have large wheels. Some child safety seats are separable from the base, so that babies may be lifted by a handle and carried by the adult, leaving the base behind securely attached to the car seat such as shown in U.S. Pat. No. 5,567,008 by Cone, II, hereby incorporated by reference. This arrangement provides a means to quickly remove or insert the baby and car seat into a car without adjusting the straps or other means of securing the child in the seat every time the adult wishes to remove the infant. As set forth in U.S. Pat. No. 5,676,386 by Huang, the same concept is shown wherein an infant safety seat is removably secured within a stroller, which is hereby incorporated by reference.

Unlike these conventional safety seats, the instant invention provides a means of nesting a lightweight base frame with wheels within a housing of a safety seat.

SUMMARY OF THE INVENTION

The instant invention provides a carry-on child safety seat stroller incorporating conventional securing means for holding the child securely in place such as set forth in U.S. Pat. Nos. 5,676,386 by Huang and 5,567,008 by Cone, II, both of which are hereby incorporated by reference.

The present invention provides a seat for automobiles, trains, buses, trollies, planes, trucks, boats, or other vehicles wherein the safety seat can be removed to serve as a rider for infants and toddlers wherein the child can be securely held within the seat and a wheeled base frame formed integrally within the seat can instantly be expanded to form a stroller.

More particularly, the instant invention includes an collapsible integral base frame having wheels which is nested into a housing formed in the base of the safety seat, wherein the base frame is extendible so that support members lift the safety seat within the seat housing. A means of pushing or pulling the safety seat and stroller is provided by extendable handle members.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE INVENTION

With reference to the drawings, FIGS. 1–6 show an embodiment of the present invention wherein safety seat and stroller 10 includes an integrally formed seat 14 including a bottom seat portion 16 and seat back portion 18.

Figure 1:
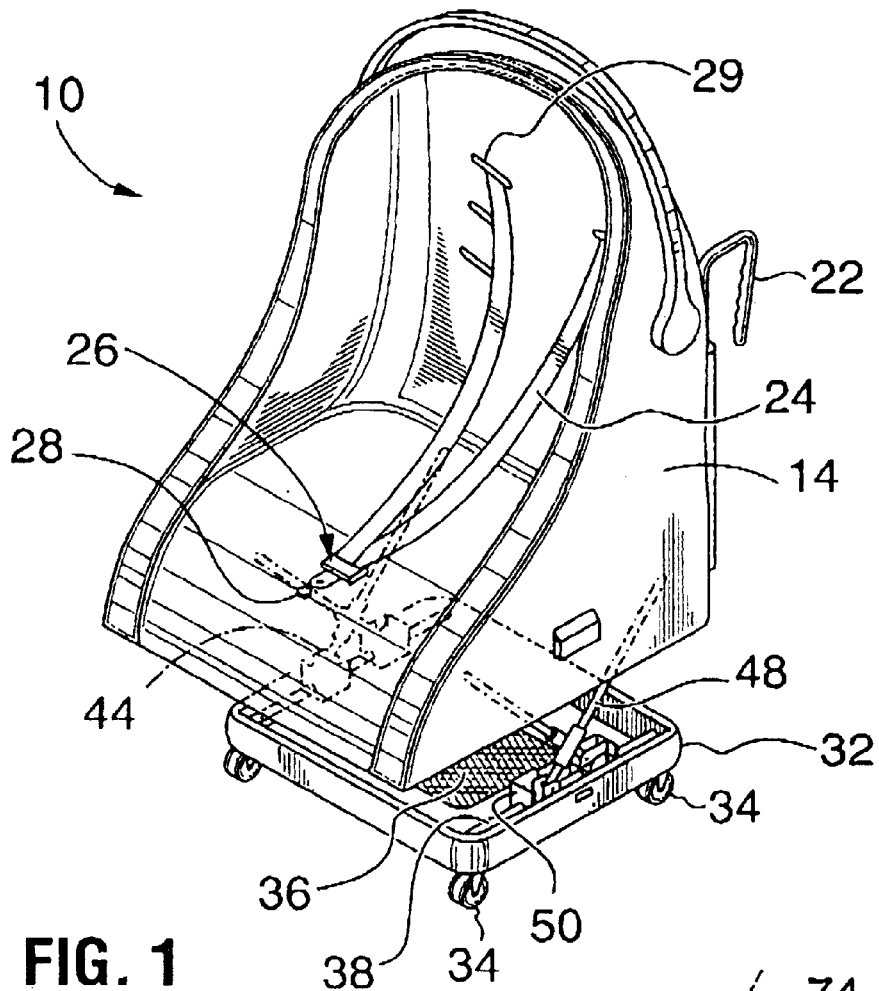
FIG. 1 is a perspective view of an embodiment of the present invention showing a safety seat having the wheeled base frame expanded in the open stroller position.

The seat and stroller 10 utilizes conventional child securing straps 24 such as shown in FIG. 1 which extend under and behind the seat 14 for cooperative engagement with a conventional auto seat belt or safety harness assembly, wherein the buckle assembly 26 includes a fastening and release latch 28 therein for reducing the slack and securing holding the child within the padded contoured seat 14. A plurality of slots 29 may be formed in the seat back 18 to provide a better fit depending upon the size of the child. A carry handle 30 may be utilized with the present invention, but it is optional. The seat 14 may also be filled with foam, other high flotation material, or a quick inflate gas inflatable bag in order that the seat float in water.

The child safety seat and stroller 10, includes a safety bar 12 extending upward from the back of a seat 14 as best shown in FIGS. 1, 4, 6, and 9. The safety bar 12 extends over the seat back.

The seat and stroller 10 includes at least one push/pull handle 22 extending from a slidable longitudinal member 62 which cooperatively engages notches, depressions, or grooves, formed within a holding tube member 64. A release mechanism, preferably comprising a spring loaded button 66, engages and disengages the safety bar. Although the handle 22 extends from behind the seat back 18, the handle 22 may be rotated sideways or removed so as not to interfere with attachment of the seat 14 in an automobile or other vehicle. A strap 68 may be used to assist in holding the safety bar 12 within the holding tube 64 when not in use.

A collapsible visor 20 is removably attached to the top of the seat back 18.

Figure 2:
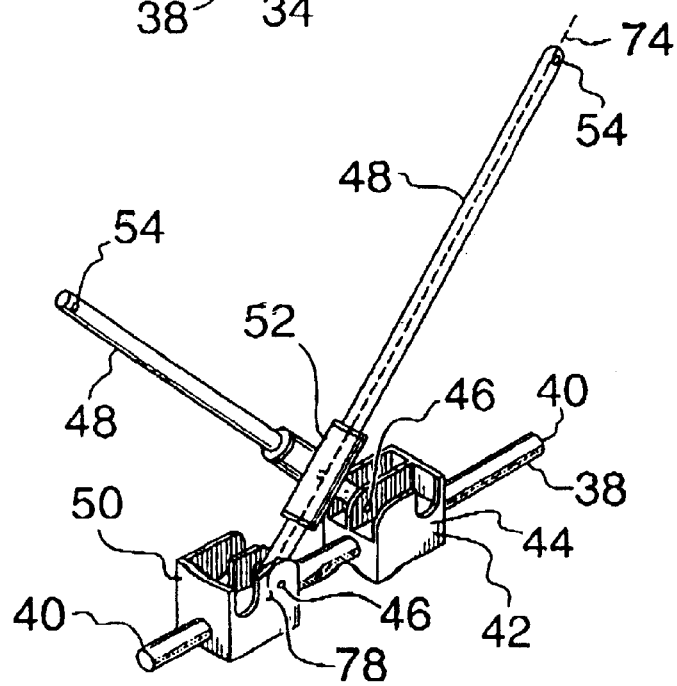
FIG. 2 is a perspective view showing the expandable sliding support members extending upwardly from the base frame of the embodiment of FIG. 1.
Figure 3:
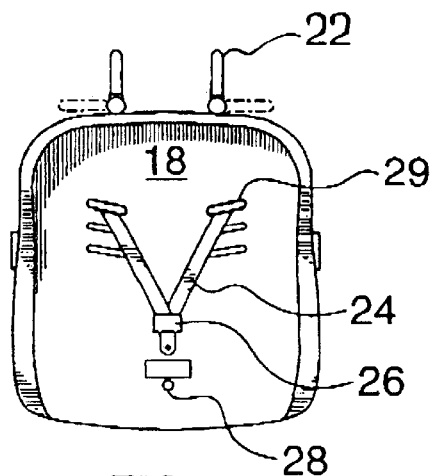
FIG. 3 is a top view showing the embodiment of FIG. 1.
Figure 4:
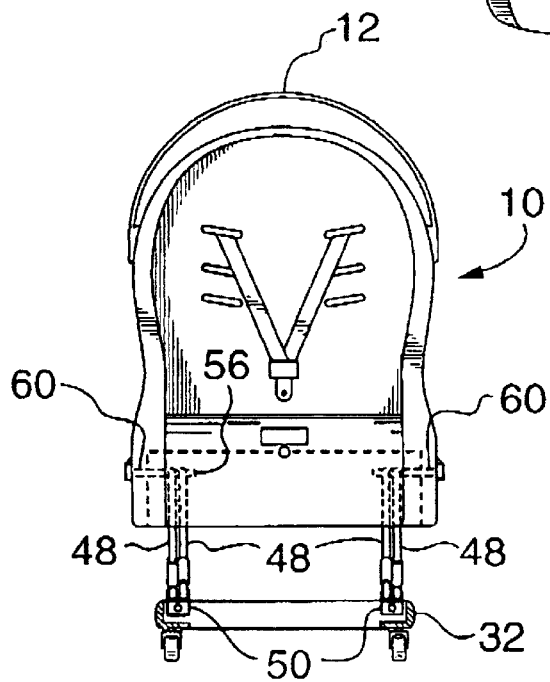
FIG. 4 is a rear view showing the embodiment of FIG. 1.
Figure 6:
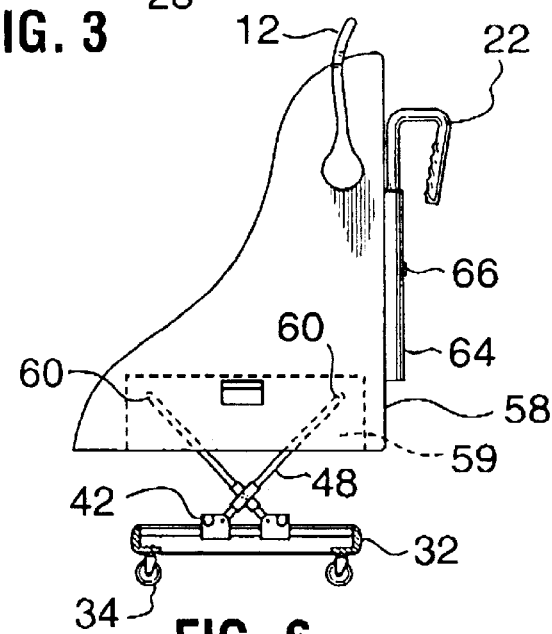
FIG. 6 is a partial cutaway side view showing the embodiment of FIG. 1 in the expanded position.
Figure 5:
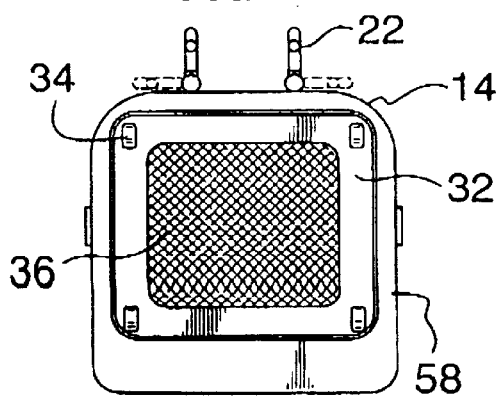
FIG. 5 is a bottom view showing the embodiment of FIG. 1.
Figure 9:
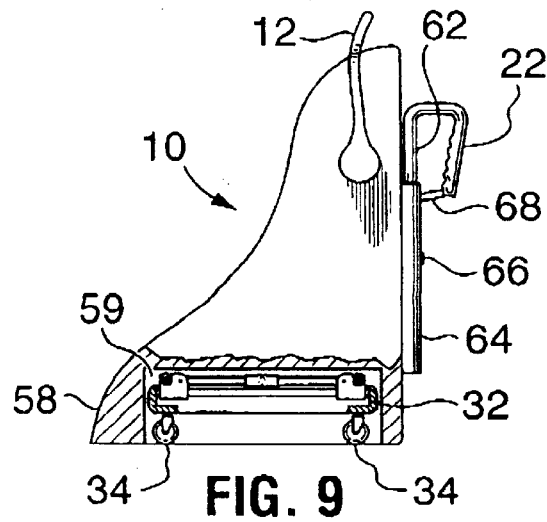
FIG. 9 is a partial cutaway side view showing the embodiment of FIG. 1 in the collapsed position.
Figure 7:
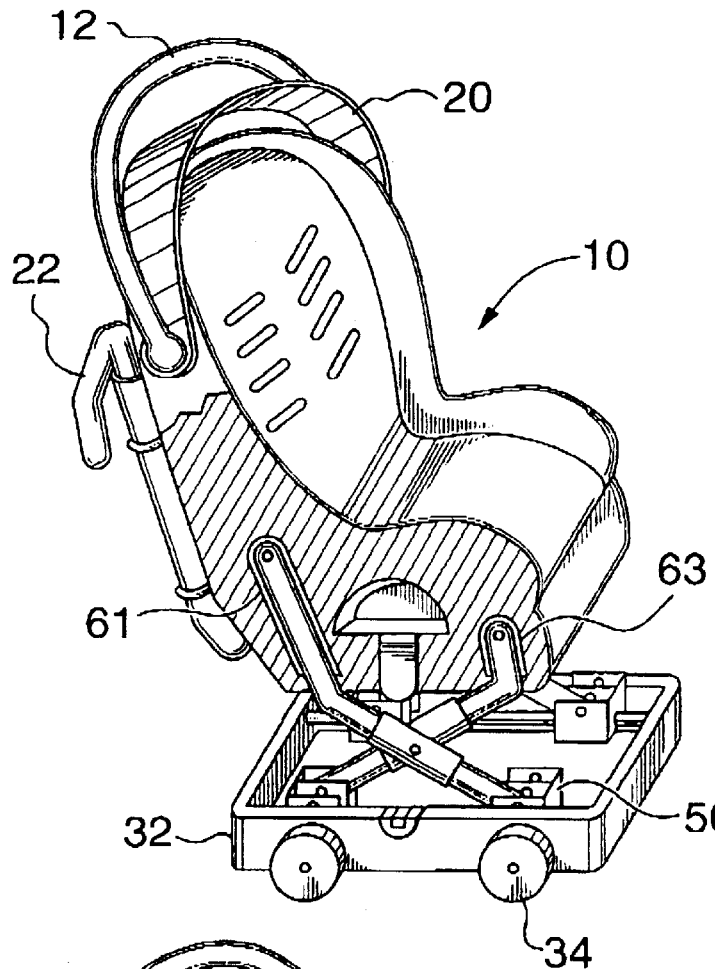
FIG. 7 is a partial cutaway view of the embodiment of FIG. 1, showing the expandable support members having an angled top portion extending into the body of the safety seat housing.
Figure 8:
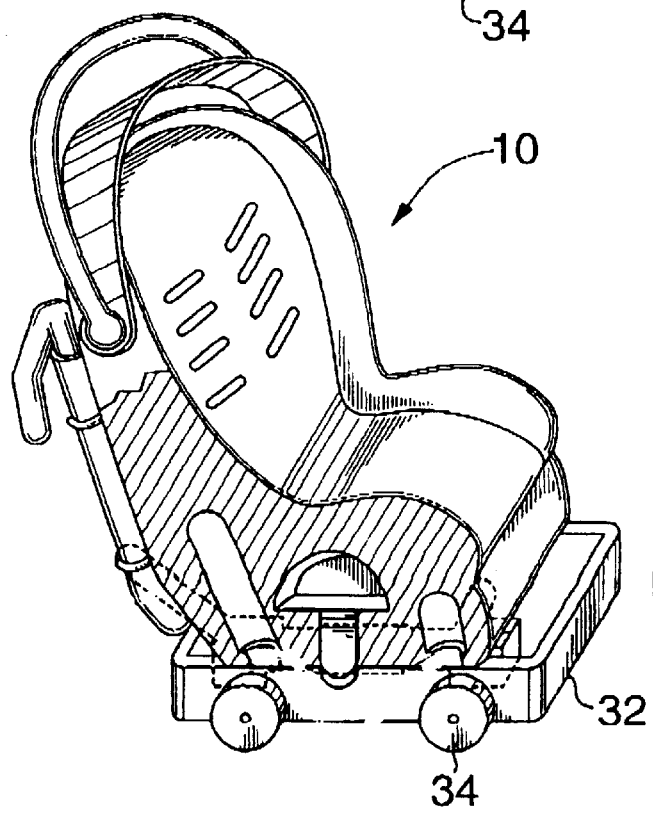
FIG. 8 is a partial cutaway view of the embodiment of FIG. 1, showing the base frame collapsed and stored within the housing of the safety seat, with the angled top portion of expandable support members extending upward therein.
Figure 10:
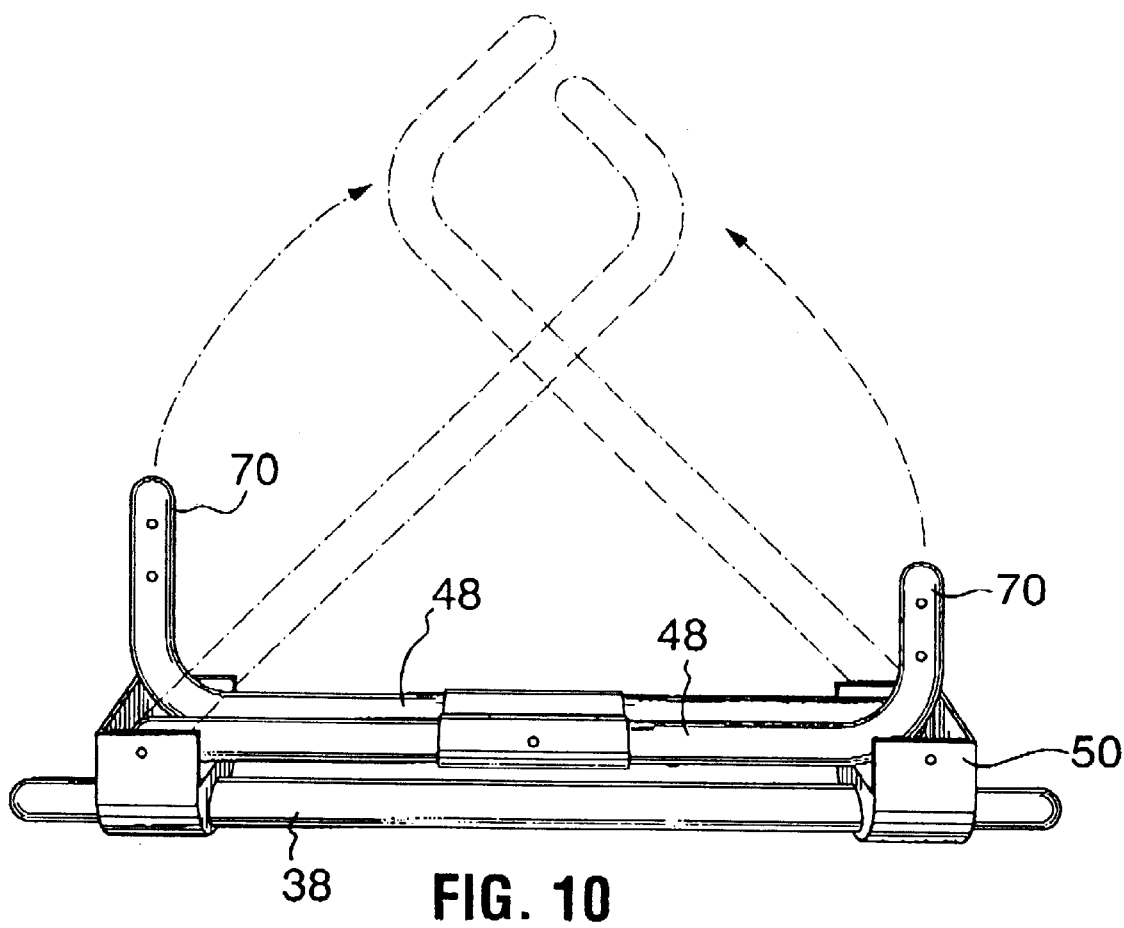
FIG. 10 is a perspective view of the present invention in the extended position showing the leg members extending upward into the frame and showing the release mechanism.
Figure 11:
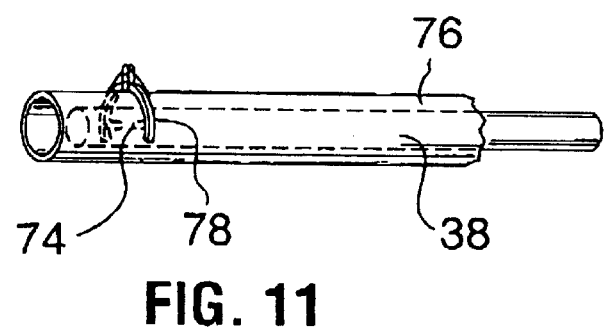
FIG. 11 is a perspective view of the present invention in the collapsed position showing leg members extending upward into the frame and showing the release mechanism.

As shown best in FIGS. 4 and 6, the carry-on safety stroller seat 10, includes a generally rectangular base frame 32. Wheels 34 extend from axles nested within the base frame 32 or the wheels 34 may be independently attached to the underside of the base frame 32 in the form of swivel casters. Moreover, swivel casters may be used for the front wheels 34 having and fixed casters may be utilized for the rear wheels for providing more control. The base frame 32 may be formed of tubing or rails. A net, or other support surface 36 may be formed separately from or integrally with the base frame 32 for holding items in the expanded stroller position. In the preferred embodiment, a pair of horizontal longitudinal members forming slide bars 38 extend along parallel to and secured to the base frame 32. The slide bars 38 are secured at or near their distal ends 40 so that sliding brackets 42 in slidable rotational engagement therewith may be supported thereby. The brackets 42 include means for pivotally holding such as a pair of side flanges 44 having aligned holes 46 therein for cooperative pivotal engagement with leg members 48 held thereinbetween with holding means such as a pin, bolt, rivet, or the like. An end flange 50 may be attached to the side flanges 44 for structural support. As shown in FIG. 2, a pair of leg members 48 are pivotally held to each slide bar 38 by cooperative engagement with the sliding brackets 42. Each pair of leg members 48 having a hole formed therein at a selected medial point 52 and end point 54. Each pair of leg members 48 are crossed and pivotally held together by holding means such as pins or the like at the medial point 52. As shown in the preferred embodiments, the leg members 48 are attached to slide bars 38 on each side of the base frame 32; however, it is contemplated that the leg members 48 could alternately be attached to slide bars at the front and back of the base frame 32. While the preferred embodiment utilizes leg members 48 of a selected length, it is contemplated that each leg members 48 could be formed from two or more longitudinal members providing a telescoping leg member. The distal ends of the leg members 48 opposite the base frame 32 attach to pivot points 56 within the housing 58 forming the bottom of the safety seat 14. As shown in FIG. 4, the attachment point 56 of the leg members 48 is shown as rods or bolts 60 extending inwardly from the inner side walls of the housing 58; however, it is contemplated that other means for pivotally holding the leg members 48 to the housing 58 may be employed as well.

As shown best in FIGS. 7–11, the distal end 70 of the legs 48 opposite the base frame 32, include angles wherein they extend up into the housing 58 providing additional structural support to the extendable base frame 32 and legs 48. A brake handle and release mechanism 72 is disposed within the seat housing. A wire leader 74 or rod, as best shown in FIG. 2, extends down through the legs 48 to a rod or stringer 76 disposed coaxially within the slide bar 38. Means for engaging such as spring loaded or spring based hooks 78 extend from the stringer 76 and cooperatively engage a selected notch or groove formed at selected positioned along the sidewall, top, or bottom of the slide bar 38 holding the legs 48 in the extended position. Squeezing the lever 72, compresses the hooks 78 releasing them from the slide bar 38 allowing the legs 48 to collapse in alignment with the slide bar 38 and the base frame 32 to nest up into the housing 58 forming a pair of rear seat leg cavities 61 and a pair of front seat leg cavities 63.

While particular embodiments of the invention have been shown and described, it should be understood that the invention is not limited thereto, since many modifications are possible within the scope of the appended claims. The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A child safety seat and stroller, comprising:
   a seat having a bottom and back, said seat including a housing having a cavity formed in a bottom surface of said cavity forming a pair of side walls connected by a front wall and a rear wall;
   a collapsible base frame having a plurality of wheels extending therefrom, said collapsible base frame extending from said housing by a plurality of offset folding legs pivotally attaching to said housing at spaced apart fixed points and to a pair of opposing brackets slidable along a slide bar extending along the sides thereof, said collapsible base frame and said wheels nesting completely within said housing, said pair of side walls and said front wall and said rear wall supporting said collapsible base frame in the collapsed condition;
   means for removably holding said offset folding legs in a selected extended position; and
   means for pushing and pulling said child safety seat and stroller.

2. The child safety seat and stroller of claim 1, wherein said means for removably holding said offset folding legs in a selected extended position comprises a latch mechanism including means for holding disponsed within said slide bar for cooperatively engaging said slide bar to each one of said brackets slidable thereon.

3. The child safety seat and stroller of claim 1, wherein said means for pushing and pulling said child safety seat and stroller is removably attachable.

4. The child safety seat and stroller of claim 1, wherein said means for pushing and pulling said child safety seat and stroller comprises at one least extendable push/pull handle extending from at least one slidable longitudinal member cooperatively engaging said housing, and including a release mechanismn for adjusting the length of at least one push/pull handle.

5. The child safety seat and stroller of claim 4, wherein said handle is rotatable.

6. The child safety seat and stroller of claim 3, including a strap for securing said means for pushing and pulling to said child safety seat.

7. The child safety seat and stroller of claim 3 wherein said handle is rotatable.

8. The child safety seat and stroller of claim 1, including means for holding a child securely in position within said seat.

9. The child safety seat and stroller or claim 8, wherein said means for holding the child securely in place comprises a safety harness assembly including a seat belt assembly with a fastening and release latch cooperatively engagging said seat belt and providing means for reducing the slack and securely holding the child within said seat.

10. The child safety seat and stroller of claim 8, said seat including a plurality of slots formed in the seat back providing means for adjusting the size of said safety belt.

11. The child safety seat and stroller of claim 1 wherein said folding legs are telescoping.

12. The child safety seat and stroller of claim 1, wherein said folding legs include an angled top portion extending into a cavity within said safety seat housing.

13. The child safety seat and stroller of claim 1, including a collapsible visor removably attachable to said seat back for extending over said seat.

14. The child safety seat and stroller of claim 1, wherein selected wheels are mounted to swivel casters.

15. The child safety seat and stroller of claim 1, including means of supporting items extending inbetween said housing and said base frame for holding items in the expanded stroller position.

16. The child safety seat and stroller of claim 1, wherein said means of supporting items is a net.

17. The child safety seat and stroller of claim 16, including a safety bar extendable over said seat back and means for locking safety bar into an up position and down position.

18. The child safety seat and stroller of claim 1, wherein said seat includes means for flotation.

19. The child safety seat and stroller of claim 1, wherein said wheels are positionablely mounted to said base frame.

* * * * *